(12) United States Patent
Schultz et al.

(10) Patent No.: US 8,455,076 B2
(45) Date of Patent: Jun. 4, 2013

(54) PAPER SUBSTRATES USEFUL AS UNIVERSAL RELEASE LINERS

(75) Inventors: Steven D. Schultz, Cincinnati, OH (US); Timothy J. Bradford, Killen, AL (US); Kosaraju K. Mohan, Mason, OH (US)

(73) Assignee: International Paper Company, Memphis, TN (US)

( * ) Notice: Subject to any disclaimer, the term of this patent is extended or adjusted under 35 U.S.C. 154(b) by 502 days.

(21) Appl. No.: 12/407,997

(22) Filed: Mar. 20, 2009

(65) Prior Publication Data

US 2009/0239020 A1    Sep. 24, 2009

Related U.S. Application Data

(60) Provisional application No. 61/070,148, filed on Mar. 20, 2008.

(51) Int. Cl.
| | | |
|---|---|---|
| *B32B 9/00* | (2006.01) | |
| *B32B 9/04* | (2006.01) | |
| *B32B 33/00* | (2006.01) | |
| *B32B 27/00* | (2006.01) | |
| *B32B 7/12* | (2006.01) | |
| *B32B 29/06* | (2006.01) | |
| *B32B 37/14* | (2006.01) | |
| *B05D 3/12* | (2006.01) | |

(52) U.S. Cl.
USPC .......... 428/41.8; 428/340; 428/342; 428/343; 428/219; 428/447; 427/365

(58) Field of Classification Search
USPC .. 428/41.8, 340, 342, 343, 219, 447; 427/365
See application file for complete search history.

(56) References Cited

U.S. PATENT DOCUMENTS

| | | | |
|---|---|---|---|
| 4,022,965 A | | 5/1977 | Goheen et al. |
| 4,075,136 A | | 2/1978 | Schaper |
| 4,166,894 A | | 9/1979 | Schaper |
| 4,174,417 A | | 11/1979 | Rydell |
| 4,258,092 A | * | 3/1981 | Labar ................. 428/40.1 |
| 4,431,481 A | | 2/1984 | Drach et al. |
| 4,493,427 A | | 1/1985 | Wolkonsky |
| 4,778,782 A | * | 10/1988 | Ito et al. ................. 503/227 |
| 4,917,764 A | * | 4/1990 | Lalwani et al. ........... 162/156 |
| 4,986,882 A | | 1/1991 | Mackey et al. |
| 5,049,235 A | | 9/1991 | Barcus et al. |
| 5,160,789 A | | 11/1992 | Barcus et al. |
| 5,209,953 A | | 5/1993 | Grupe et al. |
| 5,266,250 A | | 11/1993 | Kroyer |

(Continued)

FOREIGN PATENT DOCUMENTS

| | | |
|---|---|---|
| EP | 0150772 A2 | 1/1985 |
| EP | 1323863 A1 | 7/2003 |

(Continued)

OTHER PUBLICATIONS

Roughness of paper and paperboard (Print-surf method), TAPPI T 555 om-99, pp. 1-7, 1999.

*Primary Examiner* — Lorna M Douyon
(74) *Attorney, Agent, or Firm* — Thomas W. Barnes, III; Eric W. Guttag

(57) ABSTRACT

This invention relates to a paper substrate useful as a universal release liner, as well as methods of making and using the same.

11 Claims, 1 Drawing Sheet

U.S. PATENT DOCUMENTS

| | | | |
|---|---|---|---|
| 5,360,420 A | 11/1994 | Cook et al. | |
| 5,443,899 A | 8/1995 | Barcus et al. | |
| 5,531,728 A | 7/1996 | Lash | |
| 5,662,773 A | 9/1997 | Frederick et al. | |
| 5,667,637 A | 9/1997 | Jewell et al. | |
| 5,698,074 A | 12/1997 | Barcus et al. | |
| 5,698,688 A | 12/1997 | Smith et al. | |
| H1704 H | 1/1998 | Wallajapet et al. | |
| 5,731,080 A | 3/1998 | Cousin et al. | |
| 5,776,619 A * | 7/1998 | Shanton | 428/511 |
| 5,851,662 A * | 12/1998 | Suzuki et al. | 428/352 |
| 6,020,062 A * | 2/2000 | Questel et al. | 428/354 |
| 6,146,494 A | 11/2000 | Seger et al. | |
| 6,210,767 B1 | 4/2001 | Knauf | |
| 6,361,651 B1 | 3/2002 | Sun | |
| 6,471,824 B1 | 10/2002 | Jewell | |
| 6,506,282 B2 | 1/2003 | Hu et al. | |
| 6,579,414 B2 | 6/2003 | Jewell | |
| 6,579,415 B2 | 6/2003 | Jewell | |
| 6,582,557 B2 | 6/2003 | Jewell | |
| 6,592,712 B2 | 7/2003 | Koukoulas et al. | |
| 6,592,717 B2 | 7/2003 | Jewell | |
| 6,777,075 B2 * | 8/2004 | Concannon et al. | 428/327 |
| 6,946,186 B2 | 9/2005 | Anderson et al. | |
| 7,097,881 B2 | 8/2006 | Bedmarik et al. | |
| 7,312,293 B2 | 12/2007 | Beppu et al. | |
| 2004/0197496 A1 * | 10/2004 | Song et al. | 428/32.25 |
| 2005/0089643 A1 * | 4/2005 | Abundis et al. | 427/391 |
| 2005/0123704 A1 * | 6/2005 | Sakai et al. | 428/40.1 |
| 2006/0060317 A1 * | 3/2006 | Roding et al. | 162/135 |
| 2006/0124033 A1 * | 6/2006 | Pruett et al. | 106/486 |
| 2006/0159910 A1 * | 7/2006 | Song et al. | 428/323 |
| 2007/0020462 A1 * | 1/2007 | Rudolph et al. | 428/421 |
| 2007/0044929 A1 * | 3/2007 | Mohan et al. | 162/158 |
| 2007/0116929 A1 * | 5/2007 | Fujimori et al. | 428/156 |
| 2007/0141929 A1 * | 6/2007 | Quincy et al. | 442/59 |
| 2007/0148365 A1 * | 6/2007 | Knox et al. | 427/462 |
| 2007/0166501 A1 * | 7/2007 | Seitz et al. | 428/41.8 |
| 2007/0295466 A1 * | 12/2007 | Fugitt et al. | 162/115 |
| 2009/0017234 A1 * | 1/2009 | Song et al. | 428/32.11 |
| 2009/0075065 A1 * | 3/2009 | Cherukuri et al. | 428/330 |

FOREIGN PATENT DOCUMENTS

| | | |
|---|---|---|
| JP | 2005314821 A * | 11/2005 |
| WO | WO01/32796 A1 | 5/2001 |
| WO | WO01/70418 A1 | 9/2001 |
| WO | WO2007/140992 A1 * | 12/2007 |

* cited by examiner

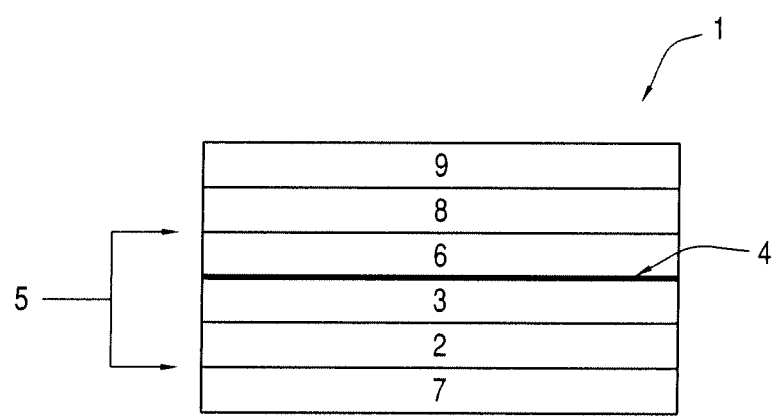

PAPER SUBSTRATES USEFUL AS UNIVERSAL RELEASE LINERS

FIELD OF THE INVENTION

This invention relates to a paper substrate useful as a universal release liner, as well as methods of making and using the same.

BACKGROUND OF THE INVENTION

Release liners and labels are described generally in U.S. Pat. Nos. 6,210,767; 7,097,881 and 7,312,293, which are hereby incorporated, in their entirety, herein by reference.

BRIEF DESCRIPTION OF THE DRAWINGS

FIG. 1 is a cross-sectional view of a label according to the present invention.

DETAILED DESCRIPTION

The present inventors have now discovered a low cost and efficient solution to create a coated paper substrate useful as a universal release liner. By universal release liners, the invention relates to those release liners that can be incorporated into labels containing solventless (emulsion) silicone containing release layers and can be used for solvent-based silicone containing release layers as well.

FIG. 1 shows a cross-section of a label 1 according to the present invention containing the paper substrate of the present invention as a release liner 2 having a coating layer 3 applied to at least one surface thereof. Optionally, the coated surface may be calendered, preferably supercalendared, after the coating is applied to a surface of the release liner to provide a calendered, preferably supercalendered coated surface 4. The present invention also relates to the composite lower structure of the label 1 without the additional layers shown in this cross-sectional view. This composite lower structure 5 contains the release liner 2, a release layer 6, and the coating composition 3 located between the release liner 2 and the release layer 6. Preferably, the composite lower structure 5 contains the calendared, preferably supercalendared, surface 4. Optionally, a backwash layer 7 may be applied to a surface of the release liner 2 opposite the surface in contact with the coating layer 3. The remaining optional layers of the label 1 of the present invention may include an adhesive layer 8 preferably applied to the release layer 6 and a facestock layer 9 preferably applied to the adhesive layer 8.

All amounts provided below in parts are based upon dry parts.

The present invention relates to a paper substrate which, in part, contains a web of cellulose fibers. The paper substrate of the present invention may contain recycled fibers and/or virgin fibers. Recycled fibers differ from virgin fibers in that the fibers have gone through the drying process several times.

The paper substrate of the present invention may contain from 1 to 99 wt %, preferably from 5 to 95 wt % of cellulose fibers based upon the total weight of the substrate, including 1, 5, 10, 15, 20, 25, 30, 35, 40, 45, 50, 55, 60, 65, 70, 75, 80, 85, 90, 95 and 99 wt %, and including any and all ranges and subranges therein.

Preferably, the sources of the cellulose fibers are from softwood and/or hardwood.

The paper substrate of the present invention may contain from 1 to 100 wt % cellulose fibers originating from softwood species based upon the total amount of cellulose fibers in the paper substrate. This range includes 1, 2, 5, 10, 15, 20, 25, 30, 35, 40, 45, 50, 55, 60, 65, 70, 75, 80, 85, 90, 95, and 100 wt %, including any and all ranges and subranges therein, based upon the total amount of cellulose fibers in the paper substrate.

The paper substrate may alternatively or overlappingly contain from 0.01 to 100 wt % fibers from softwood species most preferably from 10 to 60 wt % based upon the total weight of the paper substrate. The paper substrate contains not more than 0.01, 0.05, 0.1, 0.2, 0.5, 1, 2, 3, 4, 5, 6, 7, 8, 9, 10, 12, 15, 20, 25, 30, 35, 40, 45, 50, 55, 60, 65, 70, 75, 80, 85, 90, 95 and 100 wt % softwood based upon the total weight of the paper substrate, including any and all ranges and subranges therein.

The paper substrate may contain softwood fibers from softwood species that have a Canadian Standard Freeness (csf) of from 300 to 750, more preferably from 450 to 750. This range includes 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, and 750 csf, including any and all ranges and subranges therein. Canadian Standard Freeness is as measured by TAPPI T-227 standard test.

The paper substrate of the present invention may contain from 1 to 100 wt % cellulose fibers originating from hardwood species based upon the total amount of cellulose fibers in the paper substrate. This range includes 1, 2, 5, 10, 15, 20, 25, 30, 35, 40, 45, 50, 55, 60, 65, 70, 75, 80, 85, 90, 95, and 100 wt %, including any and all ranges and subranges therein, based upon the total amount of cellulose fibers in the paper substrate.

The paper substrate may alternatively or overlappingly contain from 0.01 to 100 wt % fibers from hardwood species, preferably from 60 to 90 wt % based upon the total weight of the paper substrate. The paper substrate contains not more than 0.01, 0.05, 0.1, 0.2, 0.5, 1, 2, 3, 4, 5, 6, 7, 8, 9, 10, 12, 15, 20, 25, 30, 35, 40, 45, 50, 55, 60, 65, 70, 75, 80, 85, 90, 95, 99 and 100 wt % fines based upon the total weight of the paper substrate, including any and all ranges and subranges therein.

The paper substrate may contain fibers from hardwood species that have a Canadian Standard Freeness (csf) of from 300 to 750, more preferably from 450 to 750 csf. This range includes 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, and 750 csf, including any and all ranges and subranges therein. Canadian Standard Freeness is as measured by TAPPI T-227 standard test.

When the paper substrate contains both hardwood and softwood fibers, it is preferable that the hardwood/softwood ratio be from 0.001 to 1000, preferably from 90/10 to 30/60. This range may include 0.001, 0.002, 0.005, 0.01, 0.02, 0.05, 0.1, 0.2, 0.5, 1, 2, 5, 10, 15, 20, 25, 30, 35, 40, 45, 50, 55, 60, 65, 70, 75, 80, 85, 90, 95, 100, 200, 300, 400, 500, 600, 700, 800, 900, and 1000 including any and all ranges and subranges therein and well as any ranges and subranges therein the inverse of such ratios.

Further, the softwood and/or hardwood fibers contained by the paper substrate of the present invention may be modified by physical and/or chemical means. Examples of physical means include, but is not limited to, electromagnetic and mechanical means. Means for electrical modification include, but are not limited to, means involving contacting the fibers with an electromagnetic energy source such as light and/or electrical current. Means for mechanical modification include, but are not limited to, means involving contacting an inanimate object with the fibers. Examples of such inanimate objects include those with sharp and/or dull edges. Such means also involve, for example, cutting, kneading, pounding, impaling, etc means.

Examples of chemical means include, but is not limited to, conventional chemical fiber modification means including crosslinking and precipitation of complexes thereon. Examples of such modification of fibers may be, but is not limited to, those found in the following U.S. Pat. Nos. 6,592,717, 6,592,712, 6,582,557, 6,579,415, 6,579,414, 6,506,282, 6,471,824, 6,361,651, 6,146,494, H1,704, U.S. Pat. Nos. 5,731,080, 5,698,688, 5,698,074, 5,667,637, 5,662,773, 5,531,728, 5,443,899, 5,360,420, 5,266,250, 5,209,953, 5,160,789, 5,049,235, 4,986,882, 4,496,427, 4,431,481, 4,174,417, 4,166,894, 4,075,136, and 4,022,965, which are hereby incorporated, in their entirety, herein by reference. Further modification of fibers is found in U.S. patent application No. 60/654,712 filed Feb. 19, 2005, which may include the addition of optical brighteners (i.e. OBAs) as discussed therein, which is hereby incorporated, in its entirety, herein by reference. Another modification of fibers is found in U.S. patent application Ser. No. 11/358,543 filed Feb. 21, 2006, now United States Published Patent Application Number 20060185808, which may include the addition of optical brighteners (i.e. OBAs) as discussed therein, which is hereby incorporated, in its entirety, herein by reference. Another modification of fibers is found in U.S. patent application Ser. No. 11/445,809 filed Jun. 2, 2006, now U.S. Pat. No. 7,638,016, and entitled "PULP AND PAPER HAVING INCREASED BRIGHTNESS", which may include the addition of optical brighteners (i.e. OBAs) as discussed therein, which is hereby incorporated, in its entirety, herein by reference. Another modification of fibers is found in U.S. patent application Ser. No. 11/446,421 filed Jun. 2, 2006, now U.S. Pat. No. 7,967,948, and entitled "IMPROVED PROCESS FOR MANUFACTURING PULP, PAPER AND PAPERBOARD PRODUCTS", which may include the addition of optical brighteners (i.e. OBAs) as discussed herein, which is hereby incorporated, in its entirety, herein by reference.

Sources of "Fines" may be found in SaveAll fibers, recirculated streams, reject streams, waste fiber streams. The amount of "fines" present in the paper substrate can be modified by tailoring the rate at which such streams are added to the paper making process.

The paper substrate preferably contains a combination of hardwood fibers, softwood fibers and "fines" fibers. "Fines" fibers are, as discussed above, recirculated and are typically not more that 100 µm in length on average, preferably not more than 90 µm, more preferably not more than 80 µm in length, and most preferably not more than 75 µm in length. The length of the fines are preferably not more than 5, 10, 15, 20, 25, 30, 35, 40, 45, 50, 55, 60, 65, 70, 75, 80, 85, 90, 95, and 100 µm in length, including any and all ranges and subranges therein.

The paper substrate contains from 0.01 to 100 wt % fines, preferably from 0.01 to 50 wt %, most preferably from 0.01 to 15 wt % based upon the total weight of the substrate. The paper substrate contains not mort than 0.01, 0.05, 0.1, 0.2, 0.5, 1, 2, 3, 4, 5, 6, 7, 8, 9, 10, 12, 15, 20, 25, 30, 35, 40, 45, 50, 55, 60, 65, 70, 75, 80, 85, 90, 95 and 100 wt % fines based upon the total weight of the paper, including any and all ranges and subranges therein.

The paper substrate may alternatively or overlappingly contain from 0.01 to 100 wt % fines, preferably from 0.01 to 50 wt %, most preferably from 0.01 to 15 wt % based upon the total weight of the fibers contained by the paper substrate. The paper substrate contains not more than 0.01, 0.05, 0.1, 0.2, 0.5, 1, 2, 3, 4, 5, 6, 7, 8, 9, 10, 12, 15, 20, 25, 30, 35, 40, 45, 50, 55, 60, 65, 70, 75, 80, 85, 90, 95 and 100 wt % fines based upon the total weight of the fibers contained by the paper substrate, including any and all ranges and subranges therein.

The present invention also relates to a web of cellulosic fibers and a composition.

The composition of the present invention may contain a binder. Examples of the binder include latexes, including any latex. Examples of latexes include syrene-butadiene-containing latexes. The amounts of the binder may range from about 10 to about 40, preferably from about 20 to about 30 parts based upon the weight of the composition. The amounts of the binder may be 10, 15, 20, 25, 30, 35, and 40 parts based upon the total weight of the composition, including any and all ranges and subranges therein.

Further examples of latexes are those having a Tg ranging from about 4 to about 10° C., preferably about 7° C. Still further examples of latexes are those that have a modulus ranging from about $7\times10^6$ to about $3\times10^7$, preferably from about $8\times10^6$ to about $2\times10^7$ dyn/cm$^2$ at a temperature range of from about 120 to about 200° F., preferably from about 140 to about 170° F. Commercial examples include those latexes available from Dow Chemical Company.

Further examples of latexes are those having no or substantially no platinum catalyst inhibitors. Platinum catalysts are traditionally used to cure release layers, including silicone-containing release layers, such as those discussed below. In one embodiment of the present invention, contamination of the coating layer with substantial amounts of platinum catalyst inhibitors, except for pigments such as calcium carbonate, is undesirable. In this embodiment, the unexpected result being that the coating layer may contain pigments such as calcium carbonate, yet still not inhibit platinum catalyst-based curing of the release layers mentioned below. Accordingly, in one embodiment of the present invention, the coating layer and/or particularly the binder itself contain less than an effective amount of any one or more platinum catalyst inhibitor (the exception now being the presence of pigments such as calcium carbonate in the coating layer), the effective amount being defined as the amount of platinum catalyst inhibitor capable of inhibiting platinum catalysts to cure silicone-containing release layers. Examples of platinum catalyst inhibitors generally accepted in the art are amines and amides such as neutralizing amines, ethanolamine, N-methylethanolamine, triethanolamine, N,N-dimethyl ethanolamine, n-butylamine, diethylamine, triethylamine, tetramethylenediamine, cyclohexylamine, melamine, dimethylformamide. Further inhibitors include nitrile, cyanate, oximo, nitroso, hydrazo, and azo compounds such as adiponitrile, 2-butoxime, alpha-nitroso-beta-naphthol. Still further, such inhibitors include chelates such as EDTA and NTA. Other inhibitors include compounds containing sulfer such as sulfides and thio compounds; compounds containing tin such as tin salts; compounds containing phosphorus such as phosphines and phosphites; compounds containing arsenic, antimony, selenium, and tellurium; solvents or monomers containing chlorinated hydrocarbons with amine stabilizers; alcohol and ester solvents or monomers such as ethanol, methanol, ethyl acetate and vinyl acetate; and compounds with unsaturated bonds.

While traditionally, it is thought that calcium carbonate is a platinum catalyst inhibitor, the composition of the present invention may contain at least one calcium carbonate, precipitated or ground. The calcium carbonate may range from about 10 to about 30 parts, preferably from about 15 to about 25 parts, based upon the weight of the composition. Commercial examples include those calcium carbonates available as Covercarb HP. The amounts of the calcium carbonate may be 10, 15, 20, 25, and parts based upon the total weight of the composition, including any and all ranges and subranges therein.

The composition of the present invention may contain at least one clay. The clay may range from about 10 to about 95 parts, preferably from about 35 to about 90 parts, most preferably about 85 parts, based upon the weight of the composition. Commercial examples include those clays available as Astracote clay. The amounts of the clay may be 10, 15, 20, 25, 30, 35, 40, 45, 50, 55, 60, 65, 70, 75, 80, 85, 90, and 95 parts based upon the total weight of the composition, including any and all ranges and subranges therein.

The composition of the present invention may contain starch. Any amount of starch may be present, preferably from about 0.25 to about 10 parts, from about 0.5 to about 3 part, most preferably about 1 part, based upon the weight of the composition. Examples of modified starches include, for example, oxidized, cationic, ethylated, hydroethoxylated, etc. Examples of functional equivalents are, but not limited to, polyvinyl alcohol, polyvinylamine, alginate, carboxymethyl cellulose, etc. Commercial examples include Ethylex 2040 starch. The amounts of the starch may be 0.5, 0.6, 0.7, 0.8, 0.9, 1.0, 1.1, 1.2, 1.4, 1.5, 1.6, 1.8, 2.0, 2.5 and 3.0 parts based upon the total weight of the composition, including any and all ranges and subranges therein.

The composition of the present invention may contain a crosslinker Examples of crosslinkers include dialdehydes, such as glyoxal and Sequarez 755 (a polyethoxylated dialdehyde from GenCorp (Fairlawn, Ohio)). The crosslinker may be present from about 0.01 to about 1 parts, preferably from about 0.02 to about 0.04 parts, most preferably about 0.035 parts, based upon the weight of the composition. The amounts of the crosslinker may be 0.01, 0.015, 0.02, 0.025, 0.03, 0.035, 0.04, 0.045, 0.05, 0.06, 0.08, 0.1, 0.2, 0.4, 0.6, 0.8, and 1.0 parts based upon the total weight of the composition, including any and all ranges and subranges therein.

The composition of the present invention may contain a viscosity modifier. Commercial examples include Admiral 3089. The viscosity modifier may be present from about 0.02 to 0.5 part, preferably from about 0.05 to about 0.2 parts, more preferably about 0.1 parts, based upon the weight of the composition. The amounts of the viscosity modifier may be 0.02, 0.025, 0.03, 0.035, 0.04, 0.045, 0.05, 0.06, 0.08, 0.1, 0.2, 0.4, and 0.5 parts based upon the total weight of the composition, including any and all ranges and subranges therein.

The composition of the present invention may contain at least one lubricant. Commercial examples include Suncote 450. Examples of such lubricants are calcium stearates, but are not limited thereto. The lubricant may be present from about 0.1 to 5 parts, preferably from about 0.5 to about 21 parts, based upon the weight of the composition. The amounts of the lubricant may be 0.1, 0.2, 0.3, 0.5, 0.8, 1.0, 1.5, and 2.0 parts based upon the total weight of the composition, including any and all ranges and subranges therein.

The composition of the present invention may contain a dispersant. Examples of a dispersants include polyacrylates, including low molecular weight polyacrylates. Commercial examples include Colloids 211 dispersant. The dispersant may be present from about 0.01 to about 1 part, preferably from about 0.2 to about 3 parts, most preferably about 0.25 parts based upon the weight of the composition.

The web of cellulosic fibers may have a basis weight that ranges from about 65 to about 90 lb/3000 ft$^2$, preferably from about 75 to about 85 lb/3000 ft$^2$, most preferably 78 lb/3000 ft$^2$. As an example, this web may be used as the release liner layer in FIG. 1.

To this web, the composition may be added, for example as the coating layer in FIG. 1. Preferably, the web is formed prior to such addition. Such addition may be done by any generally known coating and/or size press operation.

The composition can be applied to the substrate by any suitable technique, such as cast coating, Blade coating, air knife coating, rod coating, roll coating, gravure coating, slot-die coating, spray coating, dip coating, Meyer rod coating, reverse roll coating, extrusion coating or the like. In addition, the coating compositions can also be applied at the size press of a paper machine using rod metering, puddle, or other metering techniques. In the preferred embodiments of the invention, the composition is applied using coaters and the coatweight of the composition may be from about preferably 3 to 15 lb/3300 ft$^2$, preferably from 4 to about 8 lb/3300 ft$^2$, and most preferably from about 5 to about 7 lb/3300 ft$^2$. The coatweight of the composition applied to the web may be 3, 3.5, 4, 4.5, 5, 5.5, 6, 6.5, 7, 7.5, 8, 9, 10, 11, and 12 lb/3300 ft$^2$, where this measurement refers to lbs of composition applied to 3300 ft$^2$ of web, including any and all ranges and subranges therein.

The coated or uncoated paper or paperboard substrate is dried after treatment with the coating composition. Methods and apparatuses for drying paper or paperboard webs treated with a coating composition are well known in the paper and paperboard art. See for example G. A. Smook referenced above and references cited therein. Any conventional drying method and apparatus can be used. Consequently, these methods and apparatuses will not be described herein in any great detail. Preferably after drying the paper or paperboard web will have moisture content equal to or less than about 10% by weight. The amount of moisture in the dried paper or paperboard web is more preferably from about 5 to about 10% by weight.

After drying, the coated web may be subjected to one or more post drying steps as for example those described in G. A. Smook referenced above and references cited therein. For example, the paper or paperboard web may be calendered, preferably supercalendared, to improve the smoothness as well as other properties of the paper as for example by passing the coated paper through a nip formed by a calender. Gloss calenders (chromed steel against a rubber roll) or hot soft gloss calenders (chromed steel against a composite polymeric surface) are used to impart gloss to the top coated paper or paperboard surface. The amount of heat and pressure needed in these calenders depends on the speed of the web entering the nip, the roll sizes, roll composition and hardness, specific load, the topcoat and basecoat weights, the roughness of the under lying rough paperboard, the binder strength of the coatings, and the roughness of the pigments present in the coating.

The coated web preferably has at least one surface that is supercalendared under suitable conditions such that the resultant supercalendared web has a Parker Print Smoothness after calendaring, preferably after supercalendering, ranging from about 1.0 to about 3.0, preferably from about 1.5 to about 2.5, as measured by as measured by TAPPI test method T 555 om-99. For example, this supercalendared coated surface may be the supercalendared surface of FIG. 1. The Parker Print Smoothness may be 1, 1.1, 1.2, 1.3, 1.4, 1.5, 1.6, 1.7, 1.8, 1.9, 2.0, 2.1, 2.2, 2.3, 2.4, 2.5 and 3.0 as measured by TAPPI test method T 555 om-99, including any and all ranges and subranges therein.

The supercalendared coated web of the present invention is suitable for any applicable use. However, the coated web is particularly suitable for incorporation into a release liner and more particularly as a universal release liner. Accordingly, the supercalendared coated web may be incorporated into labels containing solventless (emulsion) silicone containing release layers and can be used for solvent-based silicone containing release layers to create, for example, the composite lower structure of FIG. 1.

Once the release layer is applied to the supercalendared coated web of the present invention to create a composite composition of the present invention, the release layer may be cured in any traditional means. In one embodiment, the release layer is cured via platinum catalyst addition and/or the application of heat.

Accordingly, the present invention also relates to a label containing the supercalendared coated release liner of the present invention. An example of such a label is shown in FIG. 1, but is not limited to this structure. FIG. 1 shows that additional optional layers may be included in the liner such as a backwash layer, an adhesive layer and a facestock layer. Such liners may be manufactured according to traditional processes in the art. Examples of incorporating release liners into labels can be found in U.S. Pat. Nos. 6,946,186; 6,210,767; 7,097,881 and 7,312,293, which are hereby incorporated, in their entirety, herein by reference. Also, additional coating layers may be applied to the surface of the facestock layer (not shown in FIG. 1). The facestock layer may contain a coated or uncoated web of cellulose fibers as well. Thus the facestock layer may be a paper or plastic substrate, but preferably not the paper substrate or the supercalendared coated paper substrate of the present invention. Any substrate may be used in the facestock layer just as any traditional adhesive may be used in the adhesive layer.

Accordingly, the label of the present invention also contains at least one release layer that is applied to a supercalendared coated surface of the release liner. The release layer may contain a release agent. Examples of the release agent may be a silicone-containing release agent. The silicone-containing release agent may be a solventless (emulsion) silicone-containing release agent and/or may be a solvent-based silicone-containing release agent.

The backwash layer traditionally contains starch, clay and optionally a crosslinker.

Accordingly, the label, substrate, or composite lower structure of the present invention also contains at least one adhesive layer. Any adhesive, glue, etc may be present in the adhesive layer. The adhesive layer is applied to the release layer.

In light of all of the above, one embodiment of the present invention includes the release liner of the present invention having a web that is coated with the composition of the present invention. The coated surface of the web is supercalendared. To the supercalendared coated surface of the release liner, a release layer is applied. The release layer may be applied as a solvent-based silicone containing release agent or a solvent-less (emulsion) silicone-containing release agent. To the release layer, the adhesive layer is applied. Finally, to the adhesive layer, a paper or plastic substrate or facestock is applied.

The following non-limiting examples illustrate various additional aspects of the invention.

EXAMPLES

Several coating parameters were evaluated. All coatings were applied to traditional paper substrates useful as release liners via a traditional pilot or a commercial blade coater and supercalendered. Table 1 shows the coating formulations A-K and coater run numbers 1-12. Coated samples from run numbers 1-12 were then supercalendered to various Parker Print Smoothness (PPS) levels, then solventless silicone-containing release layers were applied to the supercalendered surface and cured via platinum and heat (oven) to create a lower composite structure capable of being incorporated into a label such as that shown in FIG. 1.

Rub Off (RO) tests (finger and/or mechanical) and solvent extraction tests, which are an indication of degree of silicone cure, were conducted on the composite structures. Rub Off was also tested to indicate how well the silicone coating is anchored to the supercalendered surface of the coated substrate. Composition B in Table 1 demonstrated the best runnability combined with the best balance of silicone anchoring via Rub Off tests and curing via extraction tests.

As used throughout, ranges are used as a short hand for describing each and every value that is within the range, including all subranges therein.

Numerous modifications and variations on the present invention are possible in light of the above teachings. It is, therefore, to be understood that within the scope of the accompanying claims, the invention may be practiced otherwise than as specifically described herein.

All of the references, as well as their cited references, cited herein are hereby incorporated by reference with respect to relative portions related to the subject matter of the present invention and all of its embodiments

TABLE 1

| FORMULATION | A | B | C | D | E | E1 |
|---|---|---|---|---|---|---|
| Coating Formulations | | | | | | |
| PIGMENTS | | | | | | |
| Astracote Clay | 100 | 85 | 75 | 85 | 85 | 85 |
| Covercarb HP | 0 | 15 | 25 | 15 | 15 | 15 |
| Covercarb HP w/o Biocide | 0 | 0 | 0 | 0 | 0 | 0 |
| Clay w/o biocide | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| Dispex N 40 | 0 | 0 | 0 | 0 | 0 | 0 |
| Colloids 211 | 0.25 | 0.25 | 0.25 | 0.25 | 0.25 | 0.25 |
| ADDITIVES | | | | | | |
| Ethylex 2040 | 1 | 1 | 1 | 1 | 1 | 1 |
| XU 31301 | 0 | 0 | 0 | 25 | 0 | 0 |

TABLE 1-continued

| Coating Formulations | | | | | | |
|---|---|---|---|---|---|---|
| RAP 527 | 0 | 0 | 0 | 0 | 25 | 25 |
| New Rap (XU 30985) | 25 | 25 | 25 | 0 | 0 | 0 |
| XU 31662 | 0 | 0 | 0 | 0 | 0 | 0 |
| Sequarez 755 | 0.035 | 0.035 | 0.035 | 0.035 | 0.035 | 0.035 |
| Sunkote 450 | 1 | 1 | 1 | 1 | 1 | 1 |
| Admiral 3089 | 0.1 | 0.2 | 0.1 | 0.1 | 0.1 | 0.1 |
| T 100 FWA | 0 | 0 | 0 | 0 | 0 | 0 |
| Blue Dye | 0 | 0 | 0 | 0 | 0 | 0 |
| Violet Dye | 0 | 0 | 0 | 0 | 0 | 0 |
| 20-4338/77 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| BEFORE RUN | | | | | | |
| % Solids | 64.1 | 64.4 | 64.1 | 63.8 | 61.6 | 59.5 |
| pH w/NaOH | 8.2 | 8.3 | 8.3 | 8.1 | 8.4 | 8.4 |
| Viscosity @ 100 rpm w/#4 | 1420 | 1150 | 1130 | 1290 | 1158 | 780 |
| Hercules max rpm viscosity | 44.0 | 47.0 | 41.5 | 51.3 | 57.0 | 39.5 |
| Temperature [F.] | 76 | 78 | 78 | 77 | 98 | 90 |

| FORMULATION | F | G | H | I | J | K |
|---|---|---|---|---|---|---|
| PIGMENTS | | | | | | |
| Astracote Clay | 85 | 85 | 85 | 0 | 85 | 85 |
| Covercarb HP | 15 | 15 | 15 | 0 | 15 | 15 |
| Covercarb HP w/o Biocide | 0 | 0 | 0 | 25 | 0 | 0 |
| Clay w/o biocide | 0 | 0 | 0 | 75 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| Dispex N 40 | 0 | 0 | 0 | 0 | 0 | 0.25 |
| Colloids 211 | 0.25 | 0.25 | 0.25 | 0.25 | 0.25 | #REF! |
| ADDITIVES | | | | | | |
| Ethylex 2040 | 1 | 1 | 1 | 1 | 1 | 1 |
| XU 31301 | 0 | 0 | 0 | 0 | 0 | 0 |
| RAP 527 | 0 | 0 | 0 | 0 | 0 | 0 |
| New Rap (XU 30985) | 0 | 25 | 25 | 25 | 0 | 25 |
| XU 31662 | 25 | 0 | 0 | 0 | 0 | 0 |
| Sequarez 755 | 0.035 | 0.035 | 0.035 | 0.035 | 0.035 | 0.035 |
| Sunkote 450 | 1 | 0 | 1 | 1 | 1 | 1 |
| Admiral 3089 | 0.1 | 0.1 | 0.1 | 0.1 | 0.1 | 0.3 |
| T 100 FWA | 0 | 0 | 1.53 | 0 | 0 | 0 |
| Blue Dye | 0 | 0 | 0.000007 | 0 | 0 | 0 |
| Violet Dye | 0 | 0 | 9.1E−06 | 0 | 0 | 0 |
| 20-4338/77 | 0 | 0 | 0 | 0 | 25 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| BEFORE RUN | | | | | | |
| % Solids | 64.0 | 64.3 | 63.7 | | 63.5 | 64.1 |
| pH w/NaOH | 8.2 | 8.3 | 8.1 | | 8.2 | 8.3 |
| Viscosity @ 100 rpm w/#4 | 940 | 1326 | 1008 | | 1950 | 1146 |
| Hercules max rpm viscosity | 46.7 | 43.8 | 38.1 | | 41.2 | 44.5 |
| Temperature [F.] | 79 | 83 | 87 | | 88 | 78 |

What is claimed is:

1. A composite structure, comprising:
a paper substrate comprising a web comprising a plurality of cellulosic fibers;
a coating layer applied to at least one surface of said web; wherein the coated web comprises at least one supercalendered coated surface having a Parker Print Smoothness ranging from about 1.0 to about 3.0 as measured by TAPPI test method T 555 om-99, said coating layer comprising at least one latex and at least one calcium carbonate, wherein said latex:
has a Tg ranging from about 4 to about 10° C.;
has a modulus ranging from about $7\times10^6$ to about $3\times10^7$ dyn/cm$^2$ at a temperature range of from about 120 to about 200° F.; and
contains no platinum catalyst inhibitor, wherein the platinum catalyst inhibitor is one or more platinum-catalyst inhibiting compound selected from the group consisting of amine, amide, neutralizing amine, ethanolamine, N,N-methylethanolamine, triethanolamine, N,N-dimethyl ethanolamine, n-butylamine, diethylamine, triethylamine, tetramethylenediamine, cyclohexylamine, melamine, dimethylformamide, nitrile, cyanate, oximo, nitroso, hydrazo, azo, adiponitrile, 2-butoxime, alpha-nitroso-betanaphthol, chelate, EDTA, NTA, sulfur-containing compound, sulfide, thio, tin-containing compound, tin salt, phosphorus-containing compound, phosphine, phosphites, arsenic-containing compound, antimony-containing compound, selenium-containing compound, tellurim-containing compound, chlorinated hydrocarbon-containing solvent with amine stabilizer, chlorinated hydrocarbon-containing monomer with amine stabilizer, alcohol solvent, ester solvent, ethanol, methanol, ethyl acetate, vinyl acetate, unsaturated compound, and any combination thereof; and a release layer applied to the coated layer, said release layer comprising a silicone-containing release agent.

2. The composite structure according to claim 1, further comprising an adhesive layer applied to said release layer.

3. The composite structure according to claim 2, further comprising a second paper substrate or a plastic substrate applied to said adhesive layer.

4. The composite structure according to claim 1, wherein said latex is present at an amount ranging from about 10 to about 40 parts based upon the total weight of said coated layer.

5. The composite structure according to claim 4, wherein said calcium carbonate is present at an amount ranging from about 10 to about 30 parts based upon the total weight of said coated layer.

6. The composite structure according to claim 4, wherein said latex is a styrene-butadiene-containing latex.

7. The composite structure according to claim 1, wherein said paper substrate is a release liner.

8. The composite structure according to claim 1, wherein said coating layer is present at a coat weight of from about 3 to about 12 lb/3300 ft$^2$.

9. The composite structure according to claim 1, wherein said web has a basis weight of from about 65 to about 90 lb/3300 ft$^2$.

10. A composite structure having a basis weight of from about 75 to about 100 lb/3300 ft$^2$, and comprising:
    a web of cellulose fibers having at least one surface;
    at least one coating layer on said at least one surface of said web; wherein the coated web comprises at least one supercalendered coated surface having a Parker Print Smoothness ranging from 1.0 to 3.0 as measured by TAPPI test method T 555om-99, the coating layer comprising from about 20 to about 30 parts of at least one latex based upon the weight of the coating layer, and from about 15 to about 25 parts of at least one calcium carbonate based upon the weight of the coating layer, wherein said latex:
    has a Tg ranging from about 4 to about 10° C.;
    has a modulus ranging from about $7 \times 10^6$ to about $3 \times 10^7$ dyn/cm$^2$ at a temperature range of from about 120 to about 200° F.; and
    contains no platinum catalyst inhibitor, wherein the platinum catalyst inhibitor is one or more platinum-catalyst inhibiting compound selected from the group consisting of amine, amide, neutralizing amine, ethanolamine, N,N-methylethanolamine, triethanolamine, N,N-dimethyl ethanolamine, n-butylamine, diethylamine, triethylamine, tetramethylenediamine, cyclohexylamine, melamine, dimethylformamide, nitrite, cyanate, oximo, nitroso, hydrazo, azo, adiponitrile, 2-butoxime, alpha-nitroso-betanaphthol, chelate, EDTA, NTA, sulfur-containing compound, sulfide, thio, tin-containing compound, tin salt, phosphorus-containing compound, phosphine, phosphites, arsenic-containing compound, antimony-containing compound, selenium-containing compound, tellurim-containing compound, chlorinated hydrocarbon-containing solvent with amine stabilizer, chlorinated hydrocarbon-containing monomer with amine stabilizer, alcohol solvent, ester solvent, ethanol, methanol, ethyl acetate, vinyl acetate, unsaturated compound, and any combination thereof; and a release layer applied to the coated layer, said release layer comprising a silicone-containing release agent.

11. A method of making the composite structure according to claim 10, comprising
    forming a web comprising a plurality of cellulosic fibers;
    applying said coating layer to at least one surface of said web;
    supercalendering at least one coated surface of said web to produce said composite structure.

* * * * *